United States Patent [19]

Heyraud

[11] 4,219,753
[45] Aug. 26, 1980

[54] WINDING ARRANGEMENT FOR A DIRECT CURRENT ELECTRIC MACHINE

[76] Inventor: Marc Heyraud, rue Charles l'Eplattenier 2, 2206 Les Geneveys-sur-Coffrane, Switzerland

[21] Appl. No.: 890,804

[22] Filed: Mar. 27, 1978

[30] Foreign Application Priority Data

Mar. 28, 1977 [CH] Switzerland .......................... 3876/77

[51] Int. Cl.² ............................................. H02K 1/00
[52] U.S. Cl. .................................. 310/198; 310/206; 310/234; 310/266
[58] Field of Search ................. 310/40 MM, 266, 234, 310/220, 224, 225, 198, 201–207

[56] References Cited

U.S. PATENT DOCUMENTS

| | | | |
|---|---|---|---|
| 2,743,386 | 4/1956 | Diehl | 310/206 X |
| 3,348,086 | 10/1967 | Monma | 310/266 X |
| 3,356,877 | 12/1967 | Burr | 310/266 |
| 3,360,668 | 12/1967 | Faulhaber | 310/266 UX |
| 3,705,459 | 12/1972 | Biddison | 310/234 X |

Primary Examiner—Mark O. Budd
Attorney, Agent, or Firm—Cushman, Darby & Cushman

[57] ABSTRACT

A direct current electric machine with an ironless skew wound rotor coil rotating in the air gap of a stationary magnetic circuit is disclosed, wherein the rotor coil comprises a plurality of coil sections each connected by its ends to two corresponding collector segments and each section is constituted by at least two parts. The said parts are groups of adjacent wire turns which groups are placed side by side on the rotor cylinder and are connected in parallel to the collector segments corresponding to the coil section.

1 Claim, 5 Drawing Figures

WINDING ARRANGEMENT FOR A DIRECT CURRENT ELECTRIC MACHINE

The present invention relates to a direct current electric machine comprising a cylindrical ironless rotor coil and a stationary magnetic circuit including an air gap, the rotor coil being adapted for rotation in the said air gap. The rotor coil comprises at least one layer of wires which are placed side by side in an oblique direction with respect to the generatrices of the rotor cylinder. The coil is divided into a plurality of coil sections the ends of which are connected to corresponding collector segments of the commutator of the machine.

In machines of this type which are generally low power machines, it is in particular desired to reduce the ohmic resistance of the coil while still optimally filling the space available for the coil within the air gap. This latter condition would not be satisfied if a wire of substantially larger diameter were used. Also, if the diameter of the wire becomes larger, winding becomes more difficult, due to the small size of the coil.

A known solution as described in Swiss Pat. No. 549,342 consists in making the coil from bifilar wire so that each turn of wire is formed by two adjacent wires. This allows to obtain a total cross-section of the wire turn which is twice the cross-section of a single wire and to keep the good filling conditions related to the wire of smaller diameter. However, as will be shown later, it is difficult to industrially manufacture such a coil without having a crossing of wires which leads locally to excessive thickness of the coil and may even lead to short-circuits in the coil.

A main object of the present invention is to provide a DC machine of the above mentioned type in which the rotor coil has a very low ohmic resistance and at the same time presents a high filling factor. An other object of the invention is to provide a method for manufacturing such a rotor coil in a simple and economic manner.

According to the invention, each coil section comprises at least two groups of adjacent wire turns which groups are placed side by side on the rotor cylinder and are connected in parallel to the collector segments corresponding to the coil section.

The method according to the invention for manufacturing a rotor coil for use in a DC machine of the mentioned type consists in winding a wire onto a cylindrical winding support by means of stationary connection point pins arranged along the lateral borders of the rotor cylinder and by means of movable wire holders arranged between the said connection point pins, the wire being run around the corresponding connection point pins at the beginning and at the end of each coil section, and, after having wound a group of wire turns of a coil section, in leading the wire around the connection point pin or pins corresponding to the end of said coil section and then around the connection point pin or pins corresponding to the beginning of said coil section, whereafter winding is continued to form the next group of wire turns. The wire part joining directly the connection point pins which correspond respectively to the beginning and to the end of a coil section is being cut before the wire parts placed on the connection point pins are connected to the corresponding collector segments.

Further objects and achievements of the invention will become apparent from the following description of preferred embodiments of the invention given by way of example and illustrated in the accompanying drawings.

Figure 1:
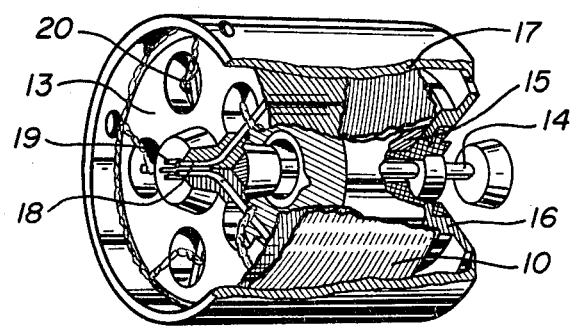
FIG. 1 is a general view of a DC machine of the type concerned by the invention.

Referring to FIG. 1, a direct current machine of small size is shown with partially cut away housing and rotor parts. A cylindrical ironless rotor coil 10 is fixed at one end thereof on a disc-shaped coil supporting part 13 which is mounted on the machine shaft 14. Inside the hollow rotor part a stationary permanent magnet 15 is hold by supporting means 16 which also support a cylindrical housing part 17 of magnetically permeable material. Permanent magnet 15 and housing part 17 form a substantially cylindrical air gap in which the rotor coil 10 is arranged for rotation. The rotor coil is formed of a plurality of coil sections the ends of which are electrically connected to collector segments such as 18, 19 for instance by soldering the wire ends at one end of a conductor part forming the collector segment such as shown at 20 in FIG. 1. The general design of such a machine is well known in the art of small DC motors.

Figure 2:
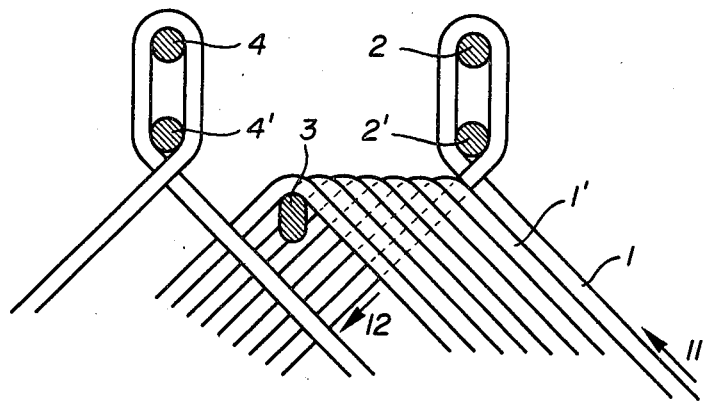
FIG. 2 is a schematic representation of a usual winding process used in winding a rotor coil.

FIG. 2 illustrates the conventional process of winding a coil with the wire parts of adjacent turns extending in oblique direction with respect to the generatrices of the rotor surface. In FIG. 2, the generatrices are parallel to the horizontal line of the drawing. When beginning the winding of a coil section, a wire 1 is led in a first oblique direction 11 on the surface of a cylindric winding support not shown. After having been wound around two stationary pins 2, 2' hereinafter called the connection point pins, wire 1 is led in a second oblique direction 12 to form another part of wire turn. Depending on the structure of the coil to be formed, the wire is led to form a closed loop of corresponding shape and then comes back in the direction 11 as shown by part 1' adjacent to the first part of the same direction. At the height of the lateral border of the coil the wire is led around a movable wire holder or pin 3 so as to change its direction and form a new part of wire turn in the direction 12 in adjacent relationship with the first mentioned part of the same direction. At the end of a coil section the wire is led around two stationary connection point pins 4, 4' and the winding is continued in the same way as from pins 2, 2' to form the following coil section.

Figure 3:
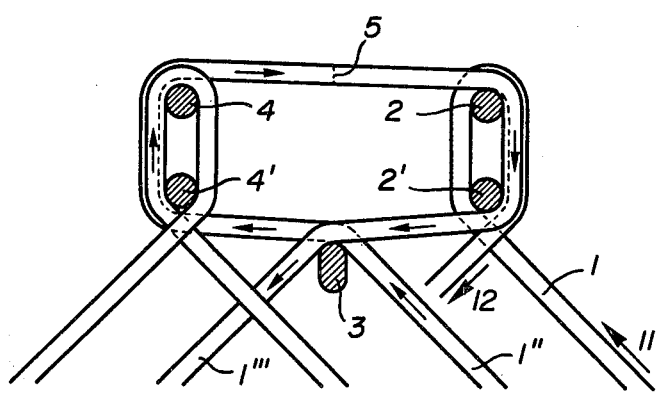
FIG. 3 is a first example illustrating a winding process in accordance with the invention and FIG. 4 is a second example of a winding process used in the method for manufacturing rotor coils of the invention.

The known solution for reducing the ohmic resistance of such a coil consists in winding simultaneously two parallel wires as shown for instance in FIGS. 2 or 3 of Swiss Pat. No. 549,302 representing two different structures of cylindrical skew wound coils. To avoid in this case an overthickness on the lateral borders of the coil, it would be necessary to use a double movable wire holder or a special arm allowing to maintain both wires in a correct mutual relationship with a permutation of the wires at each point of return. It will be understood that such a solution leads to a very complicated winding and wire packing process.

Figure 4:
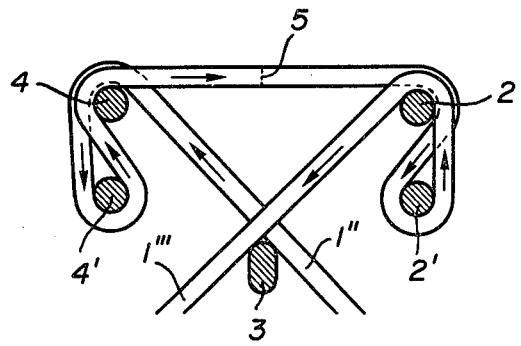

FIGS. 3 and 4 illustrate schematically a winding process which allows to use the same winding technique and winding machines as in the usual case shown in FIG. 2 while obtaining a ohmic resistance which is at least as low as in a bifilar coil.

The winding of a first part or first group of turns of a coil section is realised in the same way as shown in FIG. 2. Wire 1 arriving in direction 11 runs around the connection point pins 2, 2' at the beginning of the coil section and forms a part of wire turn in direction 12 then comes back and forms another part of wire turn similar to 1' but not represented in FIG. 3. After winding of the said part or group of winding turns of the coil section, for instance one half of the coil section, the movable wire holder 3 being then placed in an intermediate position for instance half-way between the connection point 2, 2' and 4, 4', the wire which has just formed the part 1'' in direction 11 is led over wire holder 3 and then around pins 4, 4' and 2, 2' to finally pass over wire holder 3 to form a new part of wire turn 1'''. In the case of FIG. 3, the wire is thus laid in a U-shape around each pair of stationary connection point pins 4, 4' and 2, 2' as shown by the arrows, before starting the winding of a second part of coil section.

FIG. 4 shows another way of leading the wire around the connection point pins between two parts or groups of winding turns of a coil section. Before and after reaching the intermediate position of wire holder 3 as illustrated in FIG. 4, the winding is made in the same way as shown in FIG. 3. When having formed part 1'' the wire is led in S-shape over connection pins 4 and 4', then over connection pin 4 to connection 2 and 2' in a symmetrical manner, and finally over wire holder 3 to form a new part of wire turn 1'''. This embodiment provides for increased stability of the loop around the connection point pins during the winding process.

Figure 5:
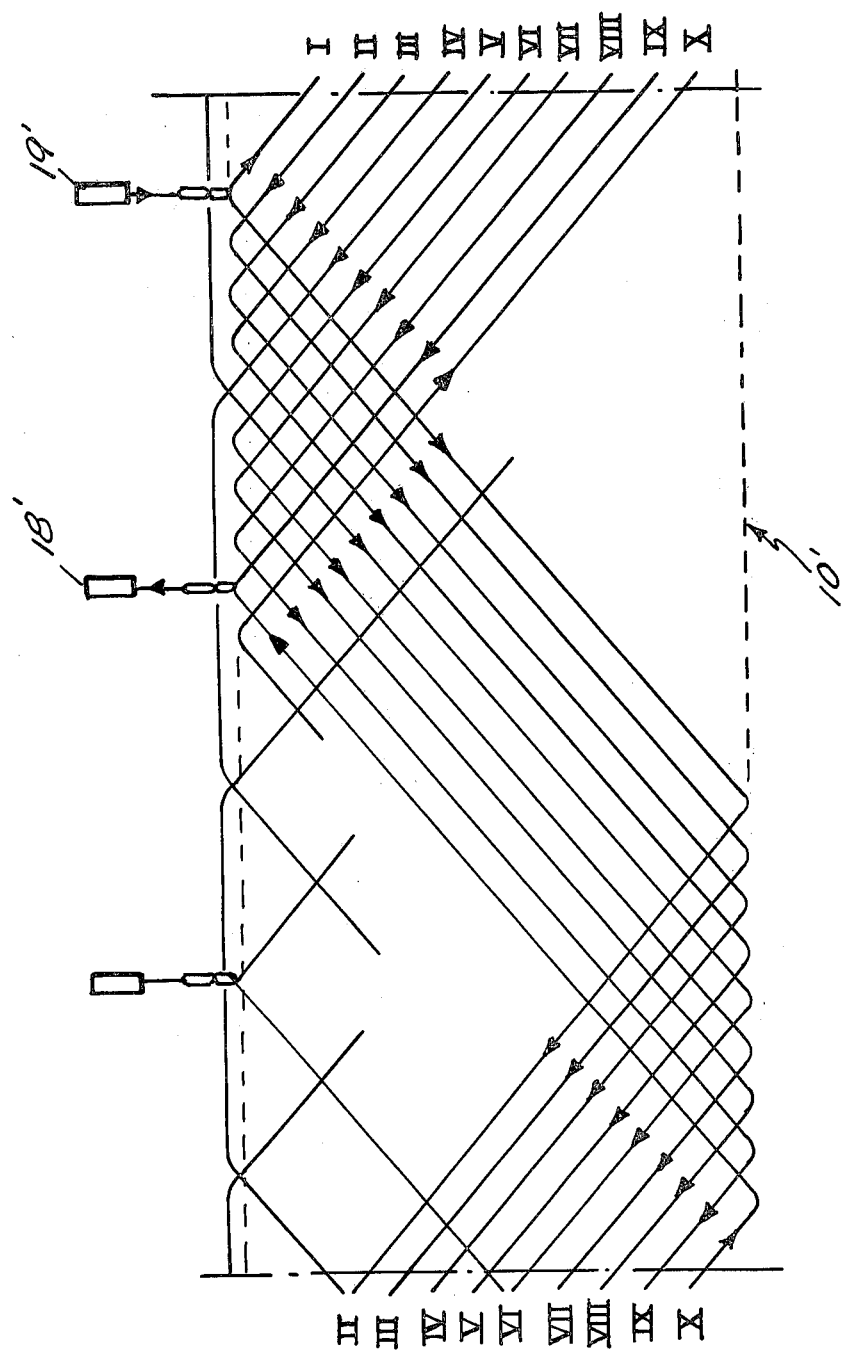
FIG. 5 is a developed projection of a winding according to the invention.

FIG. 5 shows a developed projection of a winding 10' according to the invention. The illustrated example shows a case in which the collector comprises three segments and for more clarity only the parts of the winding connected to two collector segments 18', 19' have been fully represented. It should be clear that the wire "ends" indicated in roman numerals are in fact showing the continuation of the wire in the developed diagram. Thus, the single, continuous wire of the winding follows the path I-II-III-IV . . . and so forth. The wire parts directly connected to a collector segment are as shown in detail in FIG. 3. The direction of current flow is indicated by arrows for the part of the winding connected to segments 18', 19'.

At the end of the winding process, the parts of wire joining directly the connection point pins 4 and 2 in FIGS. 3 and 4 is cut at 5 and the wire parts being placed on each pair of stationary connection point pins are connected to the corresponding segment of the collector. In this way two or more parts of each coil section can be wound in series which means consecutively in time and in adjacent relationship on the rotor surface, but they are connected in parallel between the corresponding collector segments.

It results from the preceeding that the ohmic resistance of a coil section can be reduced at least to the same extent as in the case of bifilar winding by dividing a coil section into two parts, but that it can even be considerably further reduced by forming more than two parts in a coil section. Furthermore, it will appear that the parallel mounting of parts of a coil section results in a reduction of the inductance of the said coil section.

Considering the total inductance $L_{tot}$ of for instance two groups of wire turns connected in parallel and having each an inductance $L_p$ the following relationship exists $$L_{tot} = \tfrac{1}{2}(L_p + k \cdot L_p)$$

in which k is the coefficient of mutual inductance between the said groups and $k \cdot L_p = M$ is the mutual inductance in the considered case. In a coil obtained by bifilar winding the coefficient k is near 1, while in a coil formed of two parallel parts in each coil section k can be as low as 0.6 for instance.

The life of a small DC machine such as a micomotor depending mainly on the wear of the commutator due to electroerosion by the sparks produced during the commutation, which means that this wear is proportional to $L_{tot}$, the present invention achieves a very important extension of the life time of such a machine by using the conventional winding machines and a simple and economical process.

I claim:

1. A direct-current electric machine comprising a cylindrical ironless rotor coil, a stationary magnetic circuit including an air gap, the rotor coil being adapted for rotation in the said air gap and comprising at least one layer of wires which are placed side by side in an oblique direction with respect to the generatrices of the rotor cylinder, the said coil being constituted by a plurality of coil sections, the machine further comprising commutator means including a plurality of collector segments, the wire ends of the said coil sections being electrically connected to corresponding collector segments and each coil section comprising at least two groups of adjacent wire turns which groups are placed side by side on the rotor cylinder and are connected in parallel to each other between the respective collector segments corresponding to the coil section.

* * * * *